United States Patent [19]

Goodman

[11] Patent Number: 4,864,277

[45] Date of Patent: Sep. 5, 1989

[54] RADIO ALARM SYSTEM

[76] Inventor: David J. Goodman, 31870 Hiram Trail, Moreland Hills, Ohio 44022

[21] Appl. No.: 583,396

[22] Filed: Feb. 24, 1984

[51] Int. Cl.[4] .......................... G08B 1/08; H04Q 7/00

[52] U.S. Cl. .................................... 340/539; 340/531; 42/1.15; 455/96

[58] Field of Search ........................ 340/539, 531, 532; 455/91, 95, 96, 97, 98, 99, 128; 42/1 Z, 1.01, 1.15

[56] References Cited

U.S. PATENT DOCUMENTS

| | | | |
|---|---|---|---|
| 2,519,123 | 8/1950 | Dwyer et al. | 42/1 Z |
| 2,928,935 | 3/1960 | Murray | 455/96 |
| 3,038,154 | 6/1962 | Zworykin et al. | 340/539 |
| 3,432,857 | 3/1969 | Rasmussen et al. | 42/1 Z |
| 3,906,370 | 9/1975 | Apps | 455/96 |
| 3,978,410 | 8/1976 | Fletcher et al. | 455/96 |
| 4,232,391 | 11/1980 | Zanutti | 340/539 |

*Primary Examiner*—Donnie L. Crosland
*Attorney, Agent, or Firm*—Tarolli, Sundheim & Covell

[57] ABSTRACT

An alarm system, particularly a radio transmitter alarm system in which an alarm condition causes the propulsion of an alerting radio transmitter to a high altitude, thereby significantly increasing the reliable working distance between a protected location and a staffed, alarm-receiving point.

7 Claims, 2 Drawing Sheets

RADIO ALARM SYSTEM

TECHNICAL FIELD

The present invention relates to alarm systems, and particularly to a radio transmitter alarm system adapted to transmit a radio signal from a remote location to a central receiving station or point.

The invention will be described with reference to an alarm system for remote construction sites, although it will be apparent to those skilled in the art that the present invention has other applications; for instance, perimeter security at large industrial or military sites.

BACKGROUND ART

Alarm systems that report the existence of an emergency condition, such as fire, intrusion, holdup, high water, procedure failure, etc., by means of an electrical circuit using wires connected between the protected location and an alarm reporting point, have been in common practice for nearly a century. The vast majority of these have utilized telephone circuits for connection between a protected location and an alarm reporting center. However, there have always been and continue to exist locations, because of their temporary nature, distance from telephone service or remoteness, for which wired alarm protection is not possible or practical.

Alarm systems that signal the existence of an alarm condition without using wire conductors by employing radio transmission are presently well established practice, but, like any VHF or UHF radio system, in order to guarantee a reliable signal, the transmitter antenna signaling the alarm and the receiver antenna intended to receive the alarm should be on as close to an optical line-of-sight path as possible. In practice, this is seldom achievable, so that tall antenna support structures are employed and receiving locations are specially selected for being on high ground or in tall buildings. Add to this the possibility of irregular topography, intervening structures and mandated low transmitter power and the result is, in reality, limited distance between the protected site and the alarm receiving point. In the very instances where a radio alarm system would be best employed, these technical problems have prevented its use.

This invention attacks all of the above shortcomings of existing radio alarm systems and thereby increases the effective range manifold.

It is well known to provide a flare piston or rocket, adapted to propel or project a pyrotechnic device to a high elevation, to aid in marine or air searches and rescues. However, such devices are limited to situations where a rescuer is sufficiently near to be able to observe the signal which is emitted. In addition, the signal which is emitted gives no identification, either of its sender or of the nature of the difficulty encountered.

Prior U.S. Pat. No. 2,519,123 to Dwyer et al describes one such pyrotechnic device equipped with a parachute to reduce the rate of descent of the device and increase the likelihood of its detection.

A Rasmussen at al U.S. Pat. No. 3,432,857 describes a rocket-propelled shell which contains an amount of chaff capable of reflecting a radar beam. When the shell reaches a certain altitude, the chaff is discharged to form a radar beam-reflecting cloud capable of detection. The patent discusses a problem with conventional radio transmitters adapted to transmit a homing signal, namely, the need for at least two receiving stations in range of the transmitter capable of fixing on the location of the transmitter. As with a pyrotechnic device, the signal given provides no identification either with regard to the identity of the sender or the nature of the difficulty encountered.

A Zworykin et al U.S. Pat. No. 3,038,154 describes a missile which contains, among other components, a radio transmitter adapted to transmit a radio signal to a ground receiver. The missile is provided with a parachute to slow its descent. The apparatus of the Zworykin et al patent is especially adapted for meteorological observations by exploring charged areas in the atmosphere in or near clouds and moving air masses. The apparatus is not concerned with, nor suitable for, detecting and signaling the existance of an alarm condition at a remote site.

DISCLOSURE OF INVENTION

The present invention is an alarm system adapted to record and transmit the existence of an alarm condition at a remote site, such as a construction, industrial or military site, comprising the combination of; a radio transmitter means; electrical power means effective to energize said radio tranmitter means for a short duration; housing means housing said transmitter means and power means; actuatable propulsion means adapted to propel said housing means to a peak elevation; and means responsive to an alarm condition to actuate said propulsion means.

An example of a remote site where the alarm system of the present invention may be used is a remote construction site where many large and expensive pieces of construction equipment may be located. In a preferred embodiment, an alarm device of the present invention is positioned on each one of the pieces of construction equipment deemed sensitive to theft or tampering. Each radio transmitter means is adapted to transmit a unique, identifiable coded signal adapted to be picked up at a central radio receiving station located, by way of example, in a population center. Circuitry connected to the radio receiver provides identification not only of the existance of an alarm condition, but also identification of the particular piece of equipment being tampered with or stolen.

Another example of a remote site is along the perimeter of a military compound or, alternatively, the perimeter of an industrial complex, where one or more of the alarm devices of the present invention may be located, adapted to transmit an identifiable signal in the event of an alarm condition.

In a preferred embodiment, the propulsion means is in the form of a rocket.

A still further embodiment includes, in the housing means, a lift device such as a parachute or air balloon adapted to slow the descent of the housing and transmitter means from said peak elevation.

BRIEF DESCRIPTION OF DRAWINGS

The invention and advantages thereof will become more apparent upon consideration of the following specification, with reference to the accompanying drawings, in which.

BEST MODE FOR CARRYING OUT THE INVENTION AND INDUSTRIAL APPLICABILITY

Figure 1:
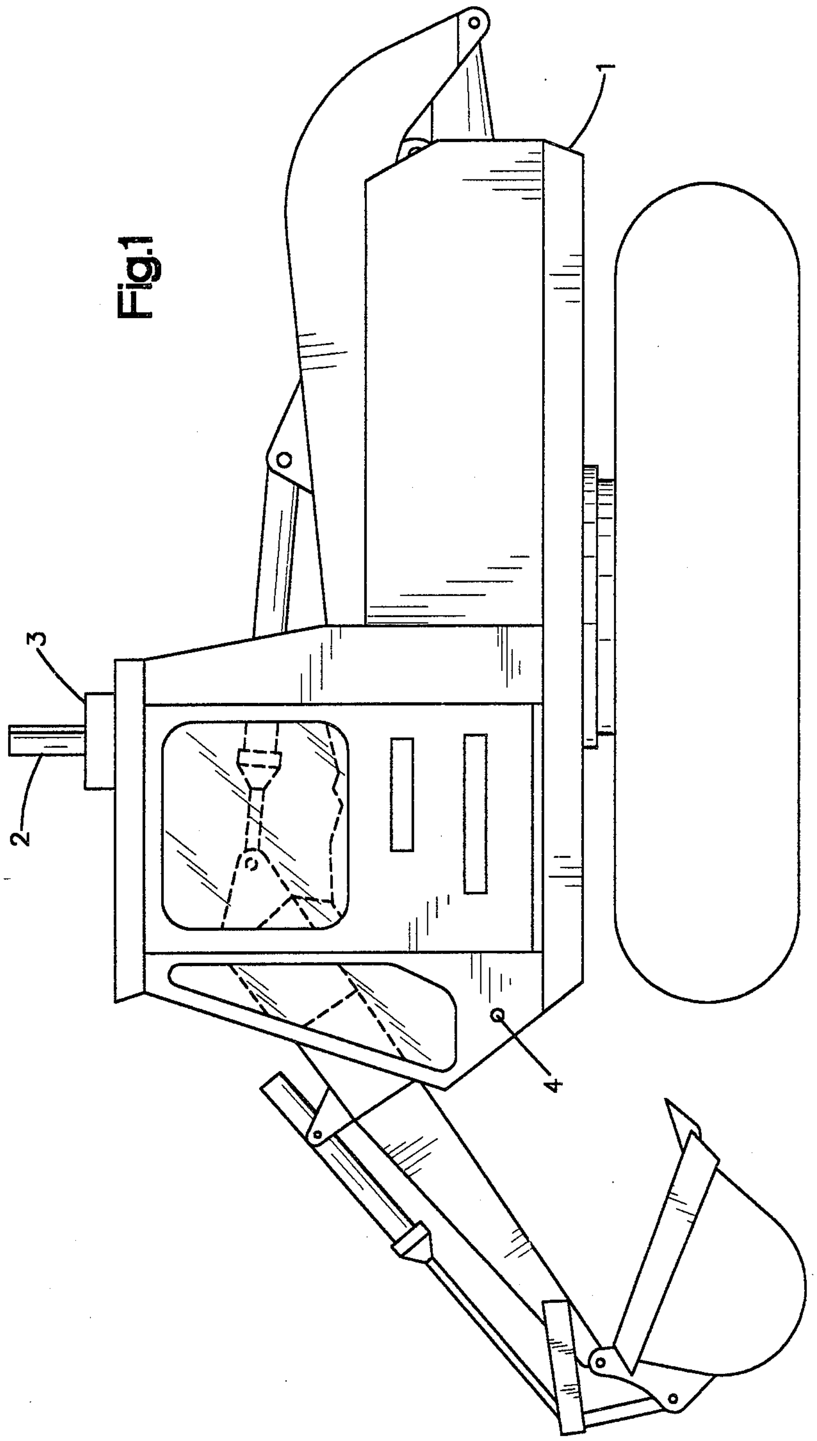
FIG. 1 is a side elevation view of a piece of construction equipment provided with the alarm system of the present invention.

The present invention is concerned principally with security or the protection of equipment at remote sites, one example, as mentioned, being the protection of earth-moving, road-grading, and other heavy mobile construction equipment, which may be left idle and unattended at a remote construction or job site for a period of time, such as overnight or over a weekend. Such construction or job sites may often be in undeveloped areas many miles from a population center or a center where a watch can be kept on the equipment.

The Federal Communications Commission (FCC) has made available, in the Code of Federal Regulations, Title 47, Chapter 1, subchapter D, part 90.75 paragraph (c) (27), a number of ultra-high frequencies which can be licensed specifically for radio alarms operated by central station commercial protection services. However, there are number of restrictions associated with the use of these frequencies. For instance, the alarm signal may be non-voice only and may not exceed two seconds, or be transmitted more than three times. The transmitter may be operated at an output of 30 watts maximum. The signal can be modulated and the kind of modulation can be any of several possible types.

The problem with ultra-high frequency transmission is that the signal can be transmitted for only a limited distance, if the transmitter is at ground level. Even with the allowed 30 watts and an elevated antenna, the range is very limited because of ground clutter and terrain variations. The use of an antenna support structure, i.e., a tower or pole, has the added disadvantage that it is heavy and expensive to construct and erect, and must be carried from site to site. It also could be very impractical to connect transmitters, on each piece of construction equipment, to a centrally located, tall antenna.

In addition, the use of an antenna has the very significant disadvantage that the feed line connection between the radio transmitter and the antenna can be readily severed, preventing any emitted signal from being heard at a central receiver in a population center many miles away.

It might also be possible to employ a system of radio relay stations to repeat an alarm signal from a remote site, but such a scheme requires additional equipment and radio frequencies and multiplies acquisition and maintenance cost, while reducing reliability. An advantage of the present invention is that such relaying would not be required.

In addition to the above specified licensed uses, the Federal Communications Commission, in part 90.233, also allows tranmission of alarms, under permitted secondary uses, in all private land mobile radio services. Such permitted secondary uses suffer from the same range limitations as the above specifically limited licensed uses.

In addition to the regulations for use requiring individual transmitter licenses, described above, the Federal Communications Commission has made available in Title 47, Chapter 1, Subchapter A, part 15.201, low power, unlicensed, radio transmitters for sending alarm signals. However, part 15.201 is limited by the requirements of part 15.205, which specifies that, at 470 MHz and above, the output power of these transmitters may not exceed 12,500 microvolts per meter at a distance of three meters. This is a very limited amount of power which is quite restrictive in range; for instance, limiting transmission to the environs of a single building or complex. Several other lower frequency bands are also available but at substantially reduced power levels. Part 15.201 does contain the provision that, for remote control purposes in emergencies such as fire, security, safety, etc., a transmitter may operate continuously during the alarm condition. The power restrictions of part 15.205 have heretofore limited the consideration of unlicensed transmitters to ranges only within an immediate area of use.

In the practice of the present invention, these disadvantages are overcome by employing a propulsion means, which may be either active or passive, adapted to carry and propel a radio transmitter to a high elevation, well above ground level. By active, it is meant a propulsion means such as a rocket which carries its own charge and, by continuous burning, is capable of flight to a height of about 800–1,000 feet, or higher, as desired. By passive, it is meant a propulsion means such as a shell within a launching mechanism containing a separate explosive charge adapted to propel the payload. Normally, the elevation reached by a passive propulsion means is much less than that reached by an active propulsion means, perhaps 200–400 feet. Depending upon circumstances, one or the other may be desired.

Considering a nominal altitude of 1,000 feet above average terrain reached by a propelled transmitter of the type herein described, distances of sixty miles or more from the alarm site to the alerting receiver may be reliably expected.

An application of the present invention is illustrated in FIG. 1, wherein the alarm system is shown installed on a typical piece of construction machinery; in this case, a trencher 1. Mounted on the roof of the trencher is a rocket launch tube 2, affixed to the top of an alarm control box 3, which contains a rechargeable battery (not shown), connected to recharge from the vehicle's regular charging circuit when the vehicle is in use. Also within the control box are tamper-detecting sensors and electrical rocket firing means. Connected to the alarm control box by wiring concealed within the trencher, is a key-operated arming switch 4. Designs of components of the alarm system, such as tamper-detecting sensors, the rocket firing means, the arming switch, and associated circuitry, are within the skill of the art.

Although the arming switch 4 is shown positioned on the outside of trencher 1, it is apparent that it can as easily be in a hidden position on the vehicle as a possible further deterrent to theft and tampering.

Figure 3:
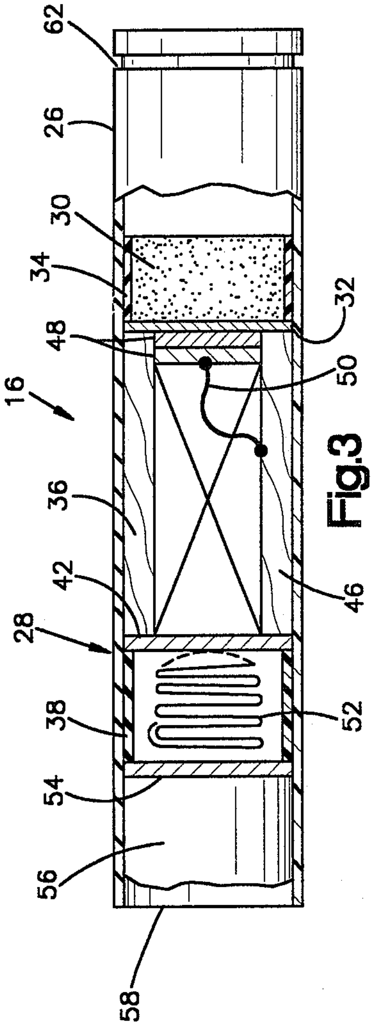
FIG. 3 is a side elevation view of a rocket means adapted for launch by the rocket launch tube of FIG. 2.
Figure 2:
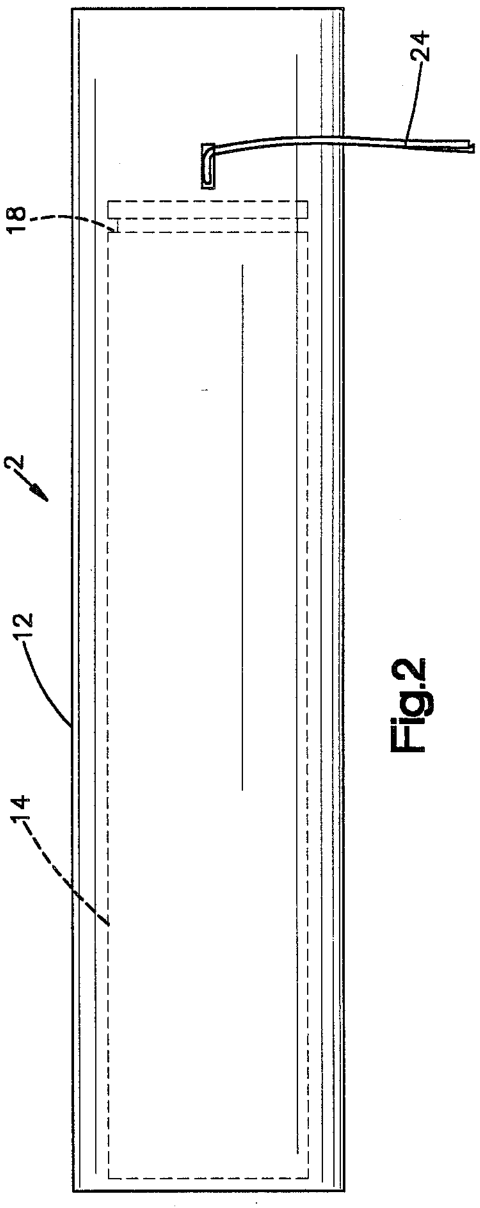
FIG. 2 is an enlarged side elevation view of a rocket launch tube of the alarm system of FIG. 1.

In FIGS. 2 and 3, an active propulsion means is illustrated.

Referring to FIG. 2, a launch tube 2 comprises a cylindrical, hollow member 12 defining a cavity 14, indicated in broken lines, adapted to receive a rocket 16 (FIG. 3). To hold the rocket in place, the cavity 14 is provided with an annular ridge 18, on the inside, located near the bottom of the cavity. Below the cavity 14, the launch tube 2 houses a firing mechanism, not shown. Details of such a firing mechanism also are known, being shown, by way of example, in the aforementioned Rasmussen et al U.S. Pat. No. 3,432,857, and other patents. The disclosure of the Rasmussen et al patent is incorporated by reference herein.

By way of example, a firing mechanism may comprise a springloaded, percussion pin which, when activated by a signal from control box 3 (FIG. 1), is adapted to contact the rocket 16 with sufficient percussion to fire the rocket motor. Shown in FIG. 2 is a wire 24 leading from the control box to the firing mechanism adapted to transmit such a signal. Normally, the wiring would also be concealed to discourage tampering.

A percussion pin-type of firing mechanism has the advantage of being simple, and easily adapted to the applications of the present invention. However, it will be apparent to those skilled in the art that many alternative firing arrangements can be employed.

Details of the rocket 16 are shown in FIG. 3. Basically, the rocket is in the form of a cylindrical shell, having a rear rocket motor section 26 and a forward payload section 28. The rocket motor section is commercially available. By way of example, rocket devices are manufactured and marketed by Olin Corporation and Kilgore Corporation.

For purposes of the present application, it is sufficient to note that the rocket motor section is generally cylindrical in shape, containing charge material 30, which on ignition, produces gases expelled out the rear of the rocket, causing the same to be propelled in the direction established by the launch tube 2. In the embodiment of FIG. 3, the rocket motor section 26 is separated from the payload section 28 by a circular disc 32, secured in the rocket by cylindrical sleeve 34.

With regard to the payload section 28, this is divided into two successive chambers designated with the numerals 36 and 38, separated from each other by circular disc 42. The first chamber is hollow and contains a radio transmitter 46 in the form of a cylindrical tube, seated between the two spacer discs 32 and 42.

The radio transmitter can be any commercially available transmitter adapted to emit a radio signal, preferably an ultra-high frequency signal, for a short period of time. In the embodiment illustrated, the radio transmitter is in the form of a printed circuit on a mylar or similar substrate, rolled into the tubular shape shown and inserted into the cylindrical payload section of the rocket.

The transmitter is powered with a low-power source such as a single or plurality of lithium cells 48 stacked together in the bottom of the hollow space, defined by the tubular transmitter. Lithium cells are selected in the preferred embodiment because of their very long shelf life. The lithium cells are readily connected to the transmitter by connection means 50, as shown. Commercially available lithium cells are about the size of a dime, or smaller, and can easily be contained within the payload section of the rocket, in the manner shown.

A large amount of power is not necessary in the practice of the present invention, a current of about 0.1 ampere for about 45 seconds, by way of example, being more than adequate, assuming a lithium cell voltage of about 1.3 volts.

The purpose of the second chamber 38 is to house a suitable descent resisting device such as a parachute or balloon. In the embodiment illustrated, the descent resisting device shown is a folded parachute 52 connected to the rocket by means of cords, not shown. A feature of this embodiment of the present invention is that one of the cords can be connected to the transmitter 46 to serve as the transmitter antenna. The chamber is capped by disc 54, designed to keep the parachute 52 in place until time of use.

A third chamber 56 is positioned at the front end of the rocket and is open to atmosphere. The disc 54 is loosely held within the chamber 56 and is also secured to the parachute 52. When the rocket reverses direction and begins its descent, the disc 54 is drawn from the chamber 56, in turn drawing the parachute 52 out. If desired, expulsion of the parachute from chamber 38 can be spring or timer assisted in accordance with known techniques.

In operation, the rocket 16 is inserted within the cavity 14 of the launch tube 2, the latter being secured to a vehicle or piece of equipment subject to theft or tampering, as shown in FIG. 1. Groove 62 at the bottom of the rocket 16 engages the annular ridge 18 in the bottom of cavity 14, retaining the rocket within the launch tube caivty. On movement of the vehicle, in this case a trencher, and/or tampering with the alarm system, sensors responsive to the movement or tampering initiate a signal which is transmitted to the launch tube 2 via wire 24, causing a percussion, or like device, to ignite the charge 30 in the rocket motor section 26 of the rocket 16. This in turn causes the rocket to be ejected with substantial force from the launch device and to be propelled to a high elevation. Normally, an active rocket, commercially available, of about 25 millimeters in diameter, is capable of about a 25 second burn to a 1,000 or 1,200 foot altitude. At the same time of firing the rocket, the radio transmitter is turned on by an inertia switch or other known mechanism, initiating broadcast of an alarm signal. Alternatively, a timer in the rocket connected between the lithium cells 48 and the radio transmitter may be necessary, in the case of the licensed use, where the transmitter duration of signal is restricted, to activate the transmitter at its peak elevation. Descent of the rocket can be slowed to some degree of ejection of the parachute from chamber 38, if desired.

It will be apparent to those skilled in the art that making the alarm system of the present invention tamper resistant includes utilization of sensing devices sensitive to all kinds of tampering, including attempts to block the launch tube and attempts to dislodge or grab the launch tube, in addition to motion detectors. However, preferably, the sensing means are not sensitive to such innocuous conditions as precipitation or small animals climbing onto the equipment.

A suitable trigger mechanism can be in the form of an electrical, closed-loop circuit which is opened in response to movement or circuit tampering, triggering the launcher and causing the rocket motor, in the case of the use of a rocket, to fire.

A large amount of power is not necessary in the practice of the present invention, a current of about 0.1 ampere for about 45 seconds, again, being adequate. Preferably, in the case of the licensed use, the radio transmitter emits a signal for about 2–5 seconds, about 3 times, and then ceases broadcasting. The three short-burst signals are more than adequate for the transmission to be picked up by a remote receiver. Federal Communications Commission regulations require that the broadcast be limited to no more than three short bursts. For low-power, non-licensed transmission, the duration of the signal may be longer than with licensed transmission, but a power supply of one or two lithium cells would still be more than adequate.

Under present Commission regulations, five frequencies are available to central station commercial protection services for remote radio alarms; 465.900, 465.925, 465.950, 465.975, and 466.000 MHz. Preferably, the radio transmitter is adapted to provide a digitally modulated signal, modulated in either amplitude or frequency. In this way, a receiver adapted to receive a signal at one of the above frequencies would be able to identify not only the location of the alarm condition, but the particular piece of equipment being tampered with.

At a frequency of about 465.9 MHz, an optimum, ¼ wave length antenna is about 6 inches long. The antenna, in the form of a wire connecting the rocket to the parachute would be about that length. Alternatively, the antenna can be in the form of a spiral or helix, positioned within the rocket, or a trailing wire or other means apparent to those skilled in the art.

Under part 15.205 of the Commission regulations, described above with respect to unlicensed uses, six bands are permitted; starting at 40.66 MHz and running to 470 MHz and above. This allows a greater choice of frequencies within the spectrum, including higher frequencies than available with licensed transmitters. Higher frequencies in turn permit the use of even shorter antennas, providing more flexibility in the design of the rocket.

In this regard, the use of a parachute is not critical to the practice of the present invention. Three short signals of about 2–5 seconds each covers a fairly short span of time. Under many circumstances, the rocket will remain at a sufficient elevation for that span of time, even without a device to slow descent, for the signal transmission to take place.

An alternative to a parachute, if a descent delay device is desired, is a gas bag. Such devices are inflated by chemical reaction producing a lighter-than-air gas filling a flexible bag. A sensor can be employed to fill the bag at a peak elevation, and filling takes a matter of only a few milliseconds.

As an alternative to a timer for activating the radio transmitter, a gravitational sensor can also activate the radio at a peak altitude when the rocket starts to lose altitude.

The present invention has been described with reference to the use of an active propulsion means. As an alternative, a passive device can be employed, comprising a payload propelled solely by a charge fired within the launching mechanism. An example would be a 12-gauge shotgun load, the shell of which is adapted to house or contain a radio transmitter in the same way described above with regard to the active rocket propulsion means. Normally, a passive payload, for instance, launched by a 12-gauge charge, can reach an altitude of about 200–400 feet, which may be adequate for many purposes.

Above, it was mentioned that the alarm system of the present invention is useful for such applications as perimeter security at remote industrial and military sites, in addition to equipment protection. The present invention has many other applications; for instance, detection of the water level in reservoirs or in rivers as a warning of dam leakage or flooding; detection of an overheating condition at a remote residence, or as a warning of fire in a forest area; and detection of pressure loss in pipe lines as a warning of blockage, freezing or pipeline break. For all applications, essentially the same components would be employed except that the sensing elements would be designed for the specific application(s) contemplated, and the radio transmitter would be coded to give a specific message indicative of the alarm condition sensed. In this regard, a single unit can be sensitive, using different sensors, to a number of different conditions, for instance, intrusion, heat and water level at a remote residence, and programed prior to firing to send a coded message dependent upon which sensor or sensors is or are activated.

I claim:

1. An alarm system for identifying the existence of an alarm condition at a remote site proximate to earth's surface, comprising:

(a) radio transmitter means at said remote site adapted to transmit a high frequency coded signal at a frequency licensed by the FCC for alarm purposes or a low power coded signal at a frequency made available by the FCC for alarm purposes without license, said signal identifying the existence of said alarm condition;

(b) radio receiver means at a second site adapted to receive said signal;

(c) electrical power means effective only to energize said radio transmitter means for a short duration;

(d) antenna means connected to said transmitter means having an antenna length effective for said transmission;

(e) housing means housing said transmitter means, power means and antenna means;

(f) actuatable rocket or charge propulsion means at said remote site adapted to propel said housing means from a position proximate to earth's surface to a peak elevation effective for line-of-sight licensed alarm or low powered non-licensed radio transmission to said second site, said short duration of transmission being defined as a period less than that during which said housing means is airborne; and (g) means at said remote site proximate to earth's surface responsive to an alarm condition to activate said propulsion means.

2. The alarm system of claim 1 including means to slow the descent of said housing means from said peak altitude.

3. The alarm system of claim 1 wherein said radio transmitter means is adapted to transmit a signal of very high frequency or ultra high frequency, said antenna means having an antenna length which is mathematically related to the wavelength.

4. The alarm system of claim 1 wherein said housing means is a rocket and said propulsion means is a rocket launcher.

5. The alarm system of claim 2 wherein said means to slow the descent of the housing means is a parachute.

6. The system of claim 1 wherein said transmitter is adapted to transmit a signal at a frequency licensed by the Federal Communications Commission.

7. The system of claim 1 wherein said transmitter is adapted to transmit a signal in compliance with regulations of the Federal Communications Commission regarding unlicensed transmission.

* * * * *